United States Patent
Yoshida et al.

(10) Patent No.: US 7,240,664 B2
(45) Date of Patent: Jul. 10, 2007

(54) VARIABLE VALVE TYPE INTERNAL COMBUSTION ENGINE AND CONTROL METHOD THEREOF

(75) Inventors: Takashi Yoshida, Tokyo (JP); Yoshihiro Sukegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/828,225

(22) Filed: Apr. 21, 2004

(65) Prior Publication Data

US 2004/0206334 A1 Oct. 21, 2004

(30) Foreign Application Priority Data

Apr. 21, 2003 (JP) .............................. 2003-116054

(51) Int. Cl.
F02M 51/00 (2006.01)
F01L 1/34 (2006.01)
(52) U.S. Cl. ..................... 123/346; 123/90.15; 123/432
(58) Field of Classification Search ................ 123/399, 123/90.15, 90.16, 90.17, 302, 308, 345, 346, 123/432
See application file for complete search history.

(56) References Cited

U.S. PATENT DOCUMENTS

| 5,669,341 A | 9/1997 | Ushirono et al. |
| 5,769,752 A | 6/1998 | Kim |
| 5,931,762 A | 8/1999 | Koyama et al. |
| 6,022,290 A | 2/2000 | Lyon |
| 6,029,511 A | 2/2000 | Welsch et al. |
| 6,311,653 B1 * | 11/2001 | Hamamoto .............. 123/90.11 |
| 6,368,250 B1 | 4/2002 | Marten et al. |
| 6,390,041 B2 | 5/2002 | Nakamura et al. |
| 6,598,570 B2 * | 7/2003 | Nakamura et al. ....... 123/90.15 |
| 6,640,771 B2 * | 11/2003 | Fuerhapter .................. 123/295 |
| 6,656,085 B2 | 12/2003 | Schmitt |
| 6,772,731 B2 * | 8/2004 | Miura ......................... 123/399 |
| 6,866,012 B2 * | 3/2005 | Hayase et al. ........... 123/90.11 |
| 6,886,533 B2 * | 5/2005 | Leiby et al. ................ 123/432 |

FOREIGN PATENT DOCUMENTS

| EP | 1 234958 | 8/2002 |
| GB | 1196557 | 7/1970 |
| JP | 07-332045 | 12/1995 |
| JP | 08-004503 | 1/1996 |
| JP | 2960942 | 1/1999 |
| JP | 2004-270608 | * 9/2004 |
| JP | 2004-324428 | * 11/2004 |

OTHER PUBLICATIONS

U.S. Appl. No. 10/372,816, filed Feb. 26, 2003, Yoshihiro Sukegawa et al.

* cited by examiner

Primary Examiner—Hai Huynh
(74) Attorney, Agent, or Firm—Crowell & Moring LLP

(57) ABSTRACT

The operation modes of plural intake valves 7a and 7b provided in one cylinder is independently changed according to the drive region of the internal combustion engine. In the low air amount region, the intake airflow is controlled only with intake valve 7a which operates in the low air amount region and the other intake valve 7b is operated in the medium and high air amount regions.

16 Claims, 7 Drawing Sheets

FIG. 8
(a)
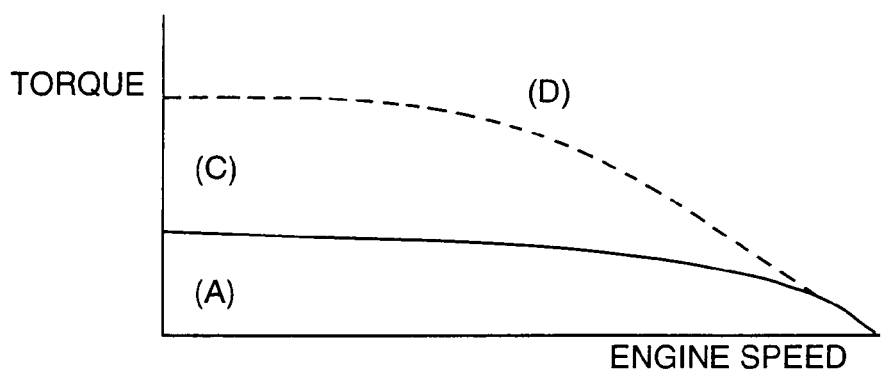
(b) LOW AIR AMOUNT REGION (A)
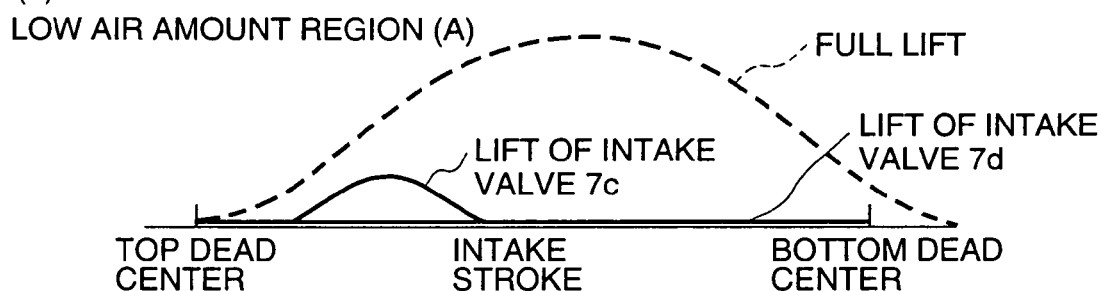
(c) HIGH AIR AMOUNT REGION (RELATIVELY LOW AIR AMOUNT) (C)
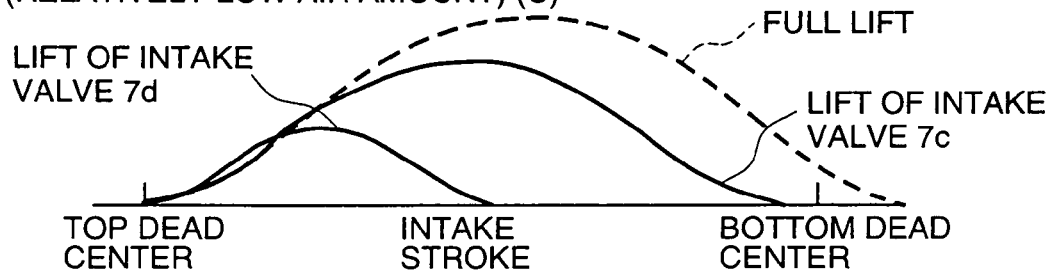
(d) HIGH AIR AMOUNT REGION (D)
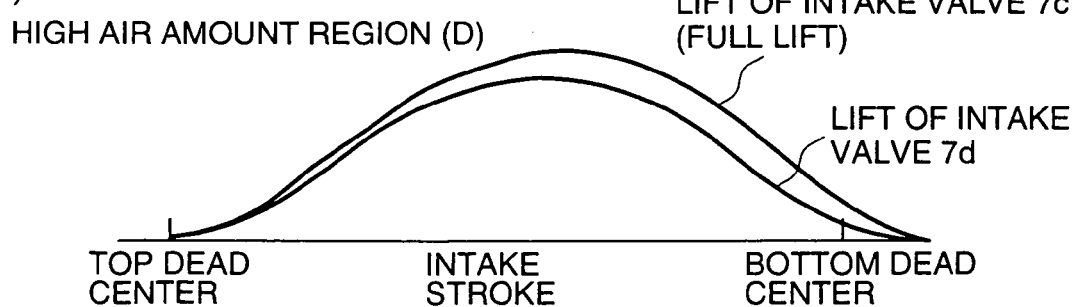

FIG. 9
(a)
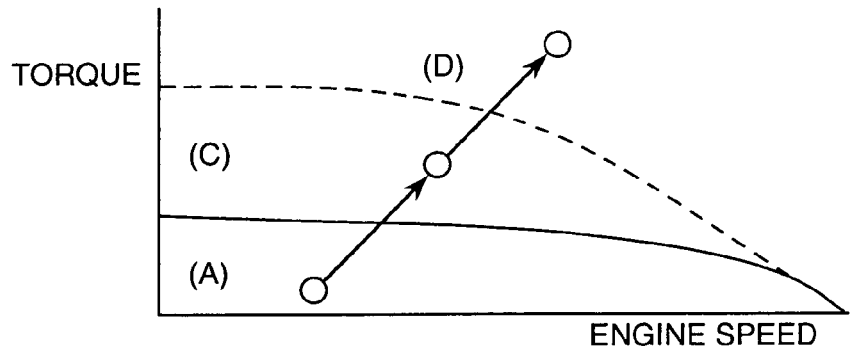
(b) (A)→(C)
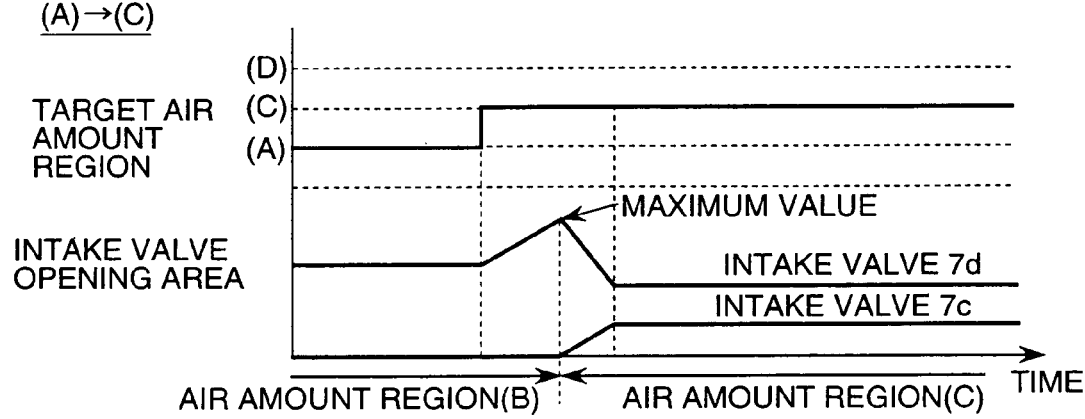
(c) (C)→(D)
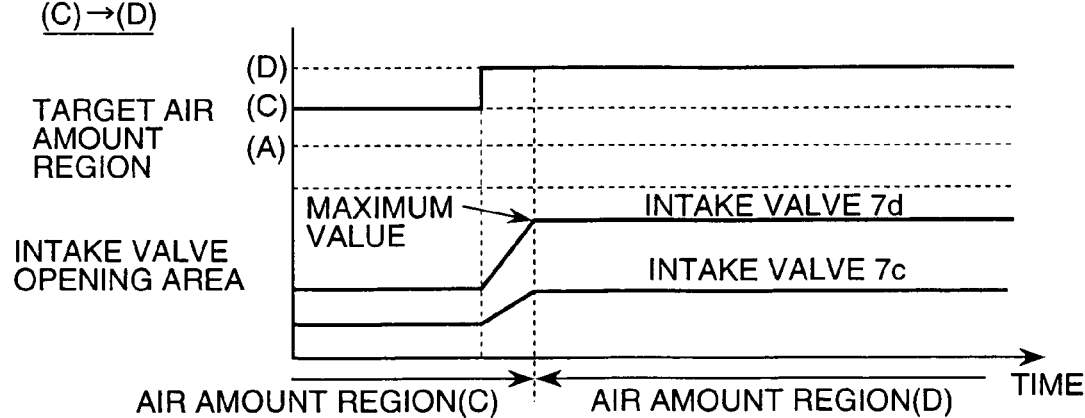

VARIABLE VALVE TYPE INTERNAL COMBUSTION ENGINE AND CONTROL METHOD THEREOF

This application claims the priority of Japanese patent document no. 2003-116054, filed Apr. 21, 2003, the disclosure of which is expressly incorporated by reference herein.

BACKGROUND OF THE INVENTION

The present invention relates to a variable valve type internal combustion engine and a control method used in vehicles such as automobiles, and particularly to a variable valve type internal combustion engine and a control method in which the intake airflow is controlled by continuously controlling the lift amount and the open valve period of the intake valve.

Recently, a variable valve type internal combustion engine is spreading for the decrease in the fuel consumption of the automobile engine, in which the intake airflow is controlled with the intake valve which can set the lift amount and the open valve period in changeability. Such a variable valve type internal combustion engine has two intake ports in one cylinder, and an intake valve which individually opens and shuts each intake port. In a low revolution region of the internal combustion engine, one intake valve is fixed in a closed state regardless of the height of the engine load, and at least one of the lift amount and the open valve period of the other intake valve is gradually increased to control the air amount as the load of the engine increases. At the same time, the swirl control is performed in the combustion chamber. (For instance, Japanese Patent Application Laid-Open No. 7-332045).

It is thought that the intake airflow is insufficient in the low revolution number and the high load region because a part of intake valves is stopped in the engine low revolution number operation region in the conventional variable valve type internal combustion engine described in Japanese Patent Application Laid-Open No. 7-332045.

Moreover, it is not considered to decrease the variation of the intake airflow due to the variation (error) of the lift amount and the open valve period of the intake valve in the low intake airflow region in the conventional variable valve type internal combustion engine. The variation of the intake airflow, especially the variation of the intake airflow in the low intake airflow region decreases extremely the control accuracy of the air fuel ratio of the mixture (fuel-air), and deteriorates the performance of an engine.

SUMMARY OF THE INVENTION

An object of the present invention to provide a variable valve type internal combustion engine and a control method in which there is no fear that the intake airflow becomes insufficient and the intake airflow is controlled with a high degree of accuracy by decreasing the variation of the intake air amount due to the variation of the lift amount and the open valve period in an internal combustion engine with a variable valve gear in which the intake air amount can be controlled by controlling continuously the lift amount and the open valve period.

To achieve the above-mentioned object, A variable valve type internal combustion engine of the present invention is provided with a plurality of intake ports provided in each cylinder, an intake valve which individually opens and shuts each intake port, and a variable valve gear which continuously and changeably sets at least one of the lift amount and the open valve period of the intake valve. The intake airflow is controlled with intake valve. The internal combustion engine is further provided with a control means in which at least one of the lift amount and the open valve period of plural intake valves can be set independently in each intake valve, and the operation modes of said plural intake valves in one cylinder can be set respectively and independently according to the operating states such as intake airflow of the internal combustion engine.

According to variable valve type internal combustion engine by this invention, the operation modes of a plurality of intake valves (lift amount and/or open valve period) in one cylinder is independently set by a control means according to the operating state of the internal combustion engine. The variation of the intake airflow due to the variation of the lift amount and the open valve period can be decreased without making the intake airflow insufficient by properly setting the operation mode of each intake valve.

In the variable valve type internal combustion engine according to the present invention, said control means stops at least one of said plural intake valves provided in one cylinder in the low air amount region, and operates the intake valve operated in the low air amount region and other intake valves in the medium and high air amount regions. By this, the variation of the intake airflow due to the variation of the lift amount and the open valve period can be decreased without making the intake airflow insufficient.

In the variable valve type internal combustion engine according to the present invention, the diameters of intake ports and the corresponding intake valves provided in one cylinder are different from each other, said control means stops the intake valve with a large diameter among said plural intake valves provided in one cylinder in the low air amount region, and operates all of said plural intake valves provided in one cylinder in the medium and high air amount region. By this, the variation of the intake airflow due to the variation of the lift amount and the open valve period can be decreased without making the intake airflow insufficient.

Further, said control means operates the intake valve with a large diameter among said plural intake valves provided in one cylinder, and stops the intake valve with a small diameter in the medium air amount region, and operates all of said plural intake valves provided in one cylinder in the high air amount region. By this, the variation of the intake airflow due to the variation of the lift amount and the open valve period can be decreased without making the intake airflow insufficient.

Further, said control means decreases the intake airflow with the intake valve which operates in the low air amount region during transition which shifts from the low air amount region to the high air amount region, and increases the intake airflow with the intake valve which operates in the medium and high air amount region during transition.

Reversely, with this, said control means decreases the intake airflow with the intake valve which operates in the medium and the high air amount regions, and increases the intake airflow with the intake valve which operates in the low air amount region during transition which shifts from the high air amount region to the low air amount region.

By this, the variation of the intake airflow due to the variation of the lift amount and the open valve period can be decreased without making the intake airflow insufficient.

Further, when the operation valve is switched from the intake valve which operates in the low air amount region to the intake valve which operates in the high air amount region, the latter minimum intake airflow is more than the former maximum intake airflow.

Further, during transition which shifts from the low air amount region to the medium and the high air amount region, said control means changes the magnitude of the decrease of the air amount which passes through the intake valve which operates in the low air amount region according to the operating state before the transition and the operating state after the transition based on the driver's intention. The transient characteristic which suits the operating state before the transition and the transient operation which the driver intends is obtained.

Further, in a variable valve type internal combustion engine according to the present invention, according to the operating state before the transition and the operating state after the transition based on the driver's intention, the air amount which passes through the intake valve which operates in the low load operation region is decreased compared with the air amount before the transition, and the increase in the air amount which passes through the intake valve which operates in the high load operation region compared with the air amount before the transition is prohibited.

The variable valve type internal combustion engine according to the present invention further includes a means which generates the negative pressure in the low air amount region in the upstream of the intake valve, wherein the control of the intake airflow in the low air amount region is performed by using one intake valve among said plural intake valves provided in one cylinder.

By this, the variation of the intake airflow due to the variation of the lift amount and the open valve period can be further decreased because the lift amount and the open valve period of the intake valve can be increased in the low air amount region.

In a variable valve type internal combustion engine according to the present invention, the fuel injection valve is provided individually in each of said plural intake ports provided in one cylinder, and the fuel injection amount to each of the plural intake port is decided depending on the air amount which passes through each of the intake valves provided in one cylinder. As a result, the generation of the mixture in a plurality of intake ports substantially becomes uniform.

Further, in a method of controlling a variable valve type internal combustion engine according to the present invention to achieve the above-mentioned object, the intake airflow is controlled with intake valve, comprising a plurality of intake ports provided in each cylinder, an intake valve which individually opens and shuts each intake port, and a variable valve gear which continuously and changeably sets at least one of the lift amount and the open valve period of the intake valve, wherein at least one of the lift amount and the open valve period of plural intake valves provided in one cylinder is controlled respectively and independently according to the operating states of the internal combustion engine.

According to variable valve type internal combustion engine by this invention, the operation modes of a plurality of intake valves (lift amount and/or open valve period) in one cylinder is independently set by a control means according to the operating state of the internal combustion engine. The variation of the intake airflow due to the variation of the lift amount and the open valve period can be decreased without making the intake airflow insufficient by properly setting the operation mode of each intake valve.

BRIEF DESCRIPTION OF DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 8 is a view showing the operation mode of the intake valve by the operating state of the variable valve type internal combustion engine according to the second embodiment of FIG. 7.

FIG. 9 is a view showing a method of controlling the intake valve operation during transition in the second embodiment of FIG. 7.

DETAILED DESCRIPTION OF THE PREFERRED EMBODIMENTS

Hereinafter, an embodiment of this invention is explained in detail referring to the figures attached.

(Embodiment 1)

Figure 1:
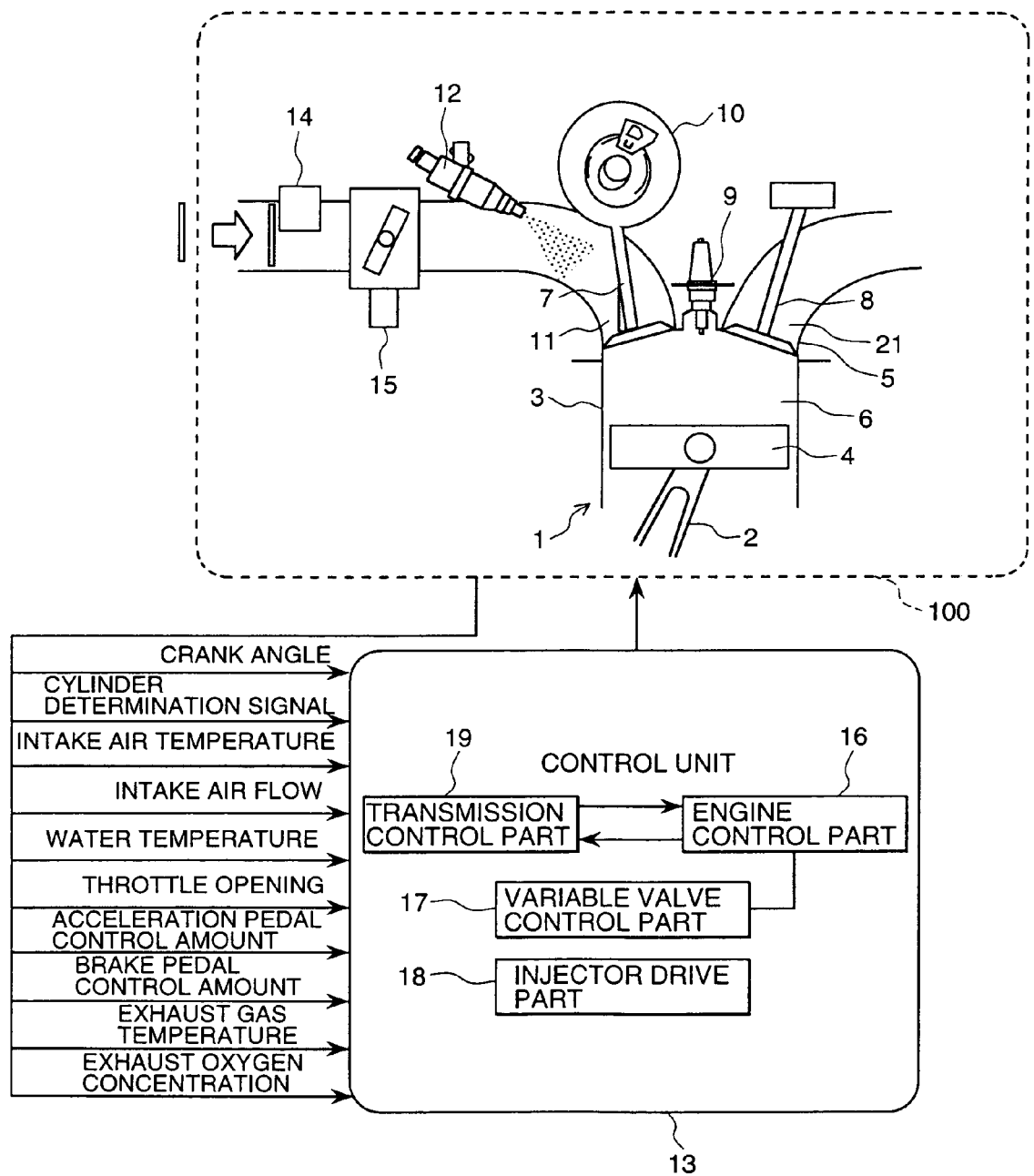
FIG. 1 is a system view of variable valve type internal combustion engine in a first embodiment of the present invention.

FIG. 1 shows an embodiment 1 of the variable valve type internal combustion engine according to the present invention. Variable valve type internal combustion engine 100 is an automotive gasoline engine, which has piston 4 that can reciprocate in cylinder bore 3 formed in cylinder block 1. Piston 4 is connected to crank chain (not shown) with connecting rod 2. Cylinder head 5 is installed in the upper part of cylinder block 1. Cylinder head 5 forms combustion chamber 6 between the cylinder head itself and piston 4. Automotive gasoline engines are usually multiple cylinder engines of four cylinders type, six cylinders type, etc. though only one cylinder (combustion chamber 6) is shown in FIG. 1.

Intake port 11 and exhaust port 21 are formed in cylinder head 5. Moreover, sparking plug 9 for the spark ignition is installed in cylinder head 5. Further, intake valve 7 which opens and shuts intake port 11 and exhaust valve 8 which opens and shuts exhaust port 21 are installed in cylinder head 5 respectively. As for intake port 11, exhaust port 21, intake valve 7 which opens and shuts intake port 11, and exhaust valve 8 which opens and shuts exhaust port 21, two each are provided in each cylinder (See FIG. 2).

Variable valve gear 10 which makes the lift amount, the open valve period and the phase change continuously is provided in intake valve 7. Fuel injection valve 12 which jets the fuel to intake port 11 is installed in the upstream side of intake valve 7.

Internal combustion engine 100 inhales air from intake port 11 into combustion chamber 6 which becomes a negative pressure by the reciprocation work of piston 4 (intake stroke). The fuel jetted from fuel injection valve 12 to intake port 11 is inhaled into combustion chamber 6 with the intake air inhaled into combustion chamber 6.

The fuel inhaled in combustion chamber 6 is mixed with the air inhaled in combustion chamber 6, ignited with sparking plug 9, and burnt. A combustion gas of combustion chamber 6, that is, the exhaust gas is exhausted from exhaust port 21 to the outside of the combustion chamber 6 by the reciprocation work of piston 4 (exhaust stroke).

Control unit 13 is one of the computer type, which includes engine control part 16, variable valve control part 17, injector drive circuit 18, and change gear control part 19, etc. The control unit 13 detects the operating state of internal combustion engine 100 based on output signals of various sensors, and controls variable valve gear 10, fuel injection valve 12, and sparking plug 9 installed in internal combustion engine 100 according to the detection result.

Signals input from various sensors to control unit 13 are described hereinafter. In this embodiment, the crank angle, the cylinder judgment signal, the throttle opening, the acceleration pedal control amount, the brake pedal control amount, the intake-air temperature, the intake airflow, the water temperature, the exhaust gas temperature, and the concentration of the exhaust gas oxygen are input to control unit 13. Only intake airflow sensor 14 and throttle opening sensor 15 is shown in the figure.

The fuel injection and the ignition time to each cylinder are controlled by control unit 13. They are controlled by carrying out the operation processing of the jet pulse signal and the ignition signal in control unit 13.

In internal combustion engine 100 according to this embodiment, the intake airflow can be controlled by using intake valve 7 in which variable valve gear 10 is provided so that fuel cost may improve by the pumping loss decrease. When the intake airflow is controlled with intake valve 7 in which variable valve gear 10 is provided, the intake airflow is controlled by continuously making the lift amount of intake valve 7 and the open valve period changeable in the partial load operation region. In the prior art, the pumping losses are generated most greatly in an idling operation region where the throttle enters the fully closed state. Therefore, it is an idling drive region to obtain fuel saving benefits most with the variable valve gear described according to this embodiment.

However, the variation of the intake airflow every cylce and the variation of the intake airflow between cylinders are generated due to the variations of the lift amount and the open valve period of the intake valve, because it is required extremely to reduce the lift amount and the open valve period of the intake valve to carrying out the idling operation with a variable valve gear.

Figure 2:
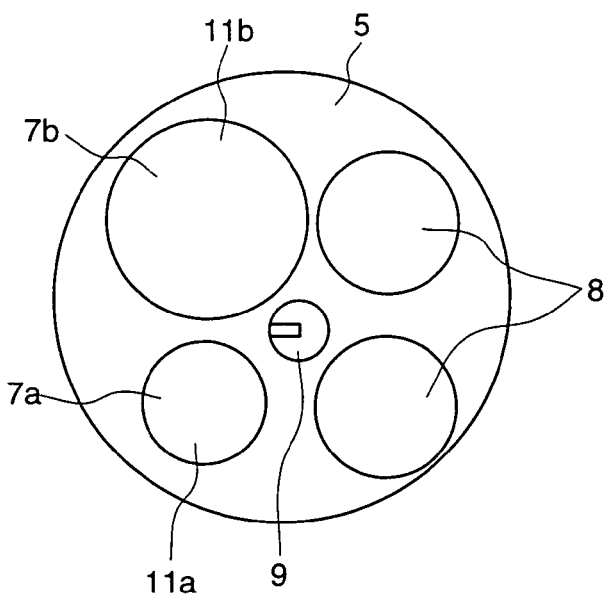
FIG. 2 is a view showing the configuration of the intake valve seat diameter of variable valve type internal combustion engine of FIG. 1.

Then, diameters of valve seats of two intake air valves provided in one cylinder are formed so as to be different with each other in this embodiment. Cylinder head 5 seen from the piston 4 side is shown in FIG. 2. In the configuration of this embodiment, intake valve 7a with a small valve seat diameter is provided for intake port 11a and intake valve 7b with a small valve seat diameter for intake port 11b.

Further, variable valve gear 10 can set respectively individually and changeably the lift amounts and the open valve periods of intake valves 7a and 7b. Variable valve control part 17 of control unit 13 which is a control means of this variable valve gear 10 independently sets and controls the operation modes of intake valves 7a and 7b in one cylinder according to the operating state of internal combustion engine 100. The operation modes of intake valves 7a and 7b mentioned here mean the combination of the lift amount, the open valve period, and the phase.

Figure 3:
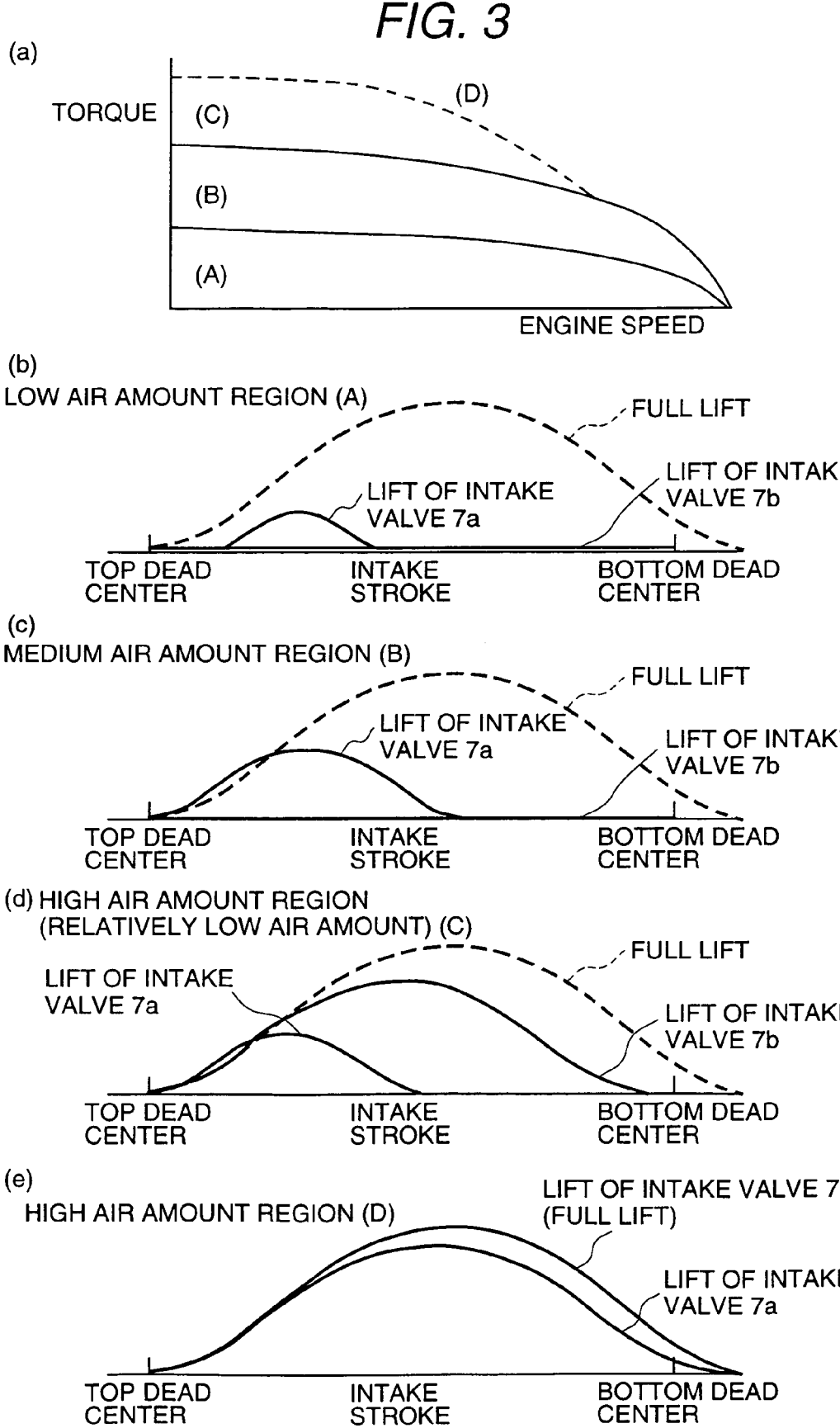
FIG. 3 is a view showing the operation mode of the intake valve to the operating state of variable valve type internal combustion engine of FIG. 1.

FIG. 3 shows the operation modes of intake valves 7a and 7b of the variable valve type internal combustion engine according to this embodiment. FIG. 3(*a*) shows the example of the distribution of low-high air amount regions (A)–(D) decided by the torque and the engine speed. The air amount (intake airflow) in this embodiment means the air amount inhaled into the engine during one cycle.

Concretely, air amount is controlled by making intake valve 7b zero-lift, and making the lift amount, the open valve period and the phase of intake valve 7a changeable in low air amount region (A) as shown in FIG. 3(*b*). In medium air amount region (B) as shown in FIG. 3(*c*), air amount is controlled by making intake valve 7a zero-lift, and making the lift amount of intake valve 7b, the open valve period, and the phase changeable. In high air amount regions (C) and (D) as shown in FIGS. 3(*d*) and 3(*e*), the intake airflow is controlled by making the lift amounts, the open valve periods and the phases of both intake valves 7a and 7b changeable.

In region (C) of the high air amount region where air amount is comparatively small, the intake airflow is reduced by reducing the lift amount and the open valve period of intake valve 7b than the state of a full lift and changing the phase, and by increasing the lift amount and the open valve period of intake valve 7a and changing the phase, the difference between the demand air amount and the air amount which passes through intake valve 7b is supplied to combustion chamber 6 through intake valve 7a.

Three intake valves may be used in similar ways though two intake valves are used in the embodiment shown in FIG. 2. When the number of intake valves is three, the intake valve with the smallest valve seat diameter is set as intake valve 7a, and other two intake valves are set as intake valve 7b with a large diameter.

In low air amount region (A) in this embodiment as described above, the intake airflow is controlled by using only intake valve 7a with the small diameter. Therefore, it is necessary to increase the lift amount and the open valve period to secure the opening space which suits the demand intake airflow compared with the case to control the intake airflow by controlling similarly each of the plural intake valves provided in one cylinder. The opening space mentioned here is port opening space per unit time of every one stroke.

Figure 4:
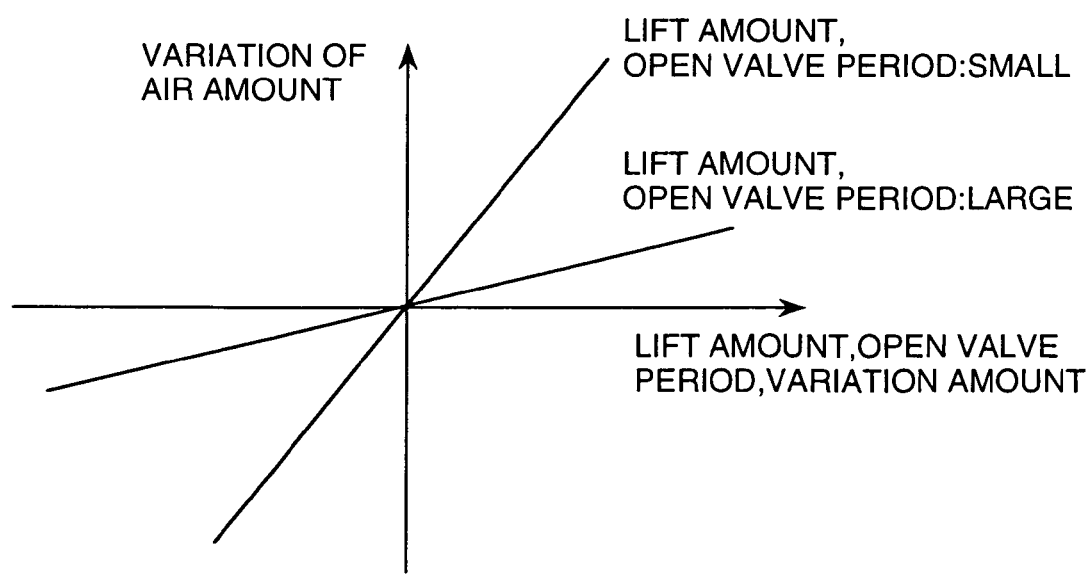
FIG. 4 is a view showing the effect of the decrease of the variation of air ount to the variation of the lift amount and the open valve period of the intake valve in the first and the second embodiments of the present invention.

As a result, the variation of the air amount due to the variation of the lift amount and the open valve period of the intake valve in low air amount region (A) can be decreased as shown in FIG. 4. Because the port diameter of intake valve 7a is small, this means the ratio of the variation of the intake airflow to the variation of the lift amount and the open valve period is small. The lift variation amount in FIG. 4 represents the variation from the target lift, and the variation of the intake airflow represents the variation from the target air amount.

In low air amount region (A) where the intake airflow is controlled only with intake valve 7a, the air amount is decided depending on the air amount when intake valve 7a is made the full lift in each engine speed. It is possible to give the negative pressure in the intake pipe by shutting the throttle provided in the upstream of the intake valve and increase the lift amount and the open valve period of intake valve 7a in low air amount region (A). The reason for this is that the air amount must be secured by increasing the opening space of intake valve 7a because the air amount filled in the intake pipe may decrease.

Because the air amount is controlled only with intake valve 7b in the medium air amount region (B), it is necessary to increase the lift amount and the open valve period to secure the opening space of intake valve 7b which suits the demand intake airflow compared with the case to operate both intake valves 7a and 7b. As a result, the variation of the intake airflow due to the variation of the lift amount and the open valve period of intake valve 7b in medium air amount region (B) can be decreased.

The reason why neither intake valve 7a nor intake valve 7b is operated in medium air amount region (B) is to exclude the addition of the variation of the intake airflow due to the variation of the lift amount and the open valve period of intake valve 7a by making intake valve 7a zero-lift. Medium air amount region (B) where the intake airflow is controlled only with intake valve 7b is decided depending on the air amount when intake valve 7b is made the full lift in each engine speed.

Both intake valve 7a and intake valve 7b are operated to secure the intake airflow in high air amount regions (C) and (D). When the lift amount and the open valve period of intake valve 7a is increased from zero-lift while maintaining the lift amount and the open valve period of intake valve 7b in the maximum value in region (C) where the air amount is comparatively small in the high air amount region, the variation of the air amount is occurred by the variation of the lift amount and the open valve period of intake valve 7a.

Then, the lift amount and the open valve period of intake valve 7a when the lift amount and the open valve period in which the variation of the air amount which passes through intake valve 7b falls within the allowable range are given are predetermined. The difference between the demand air amount and the air amount which passes through intake valve 7a can be given by controlling the lift amount, the open valve period and the phase of intake valve 7b by giving intake valve 7a the lift amount and the open valve period predetermined in region (C) where air amount is comparatively small in the high air amount region.

Figure 5:
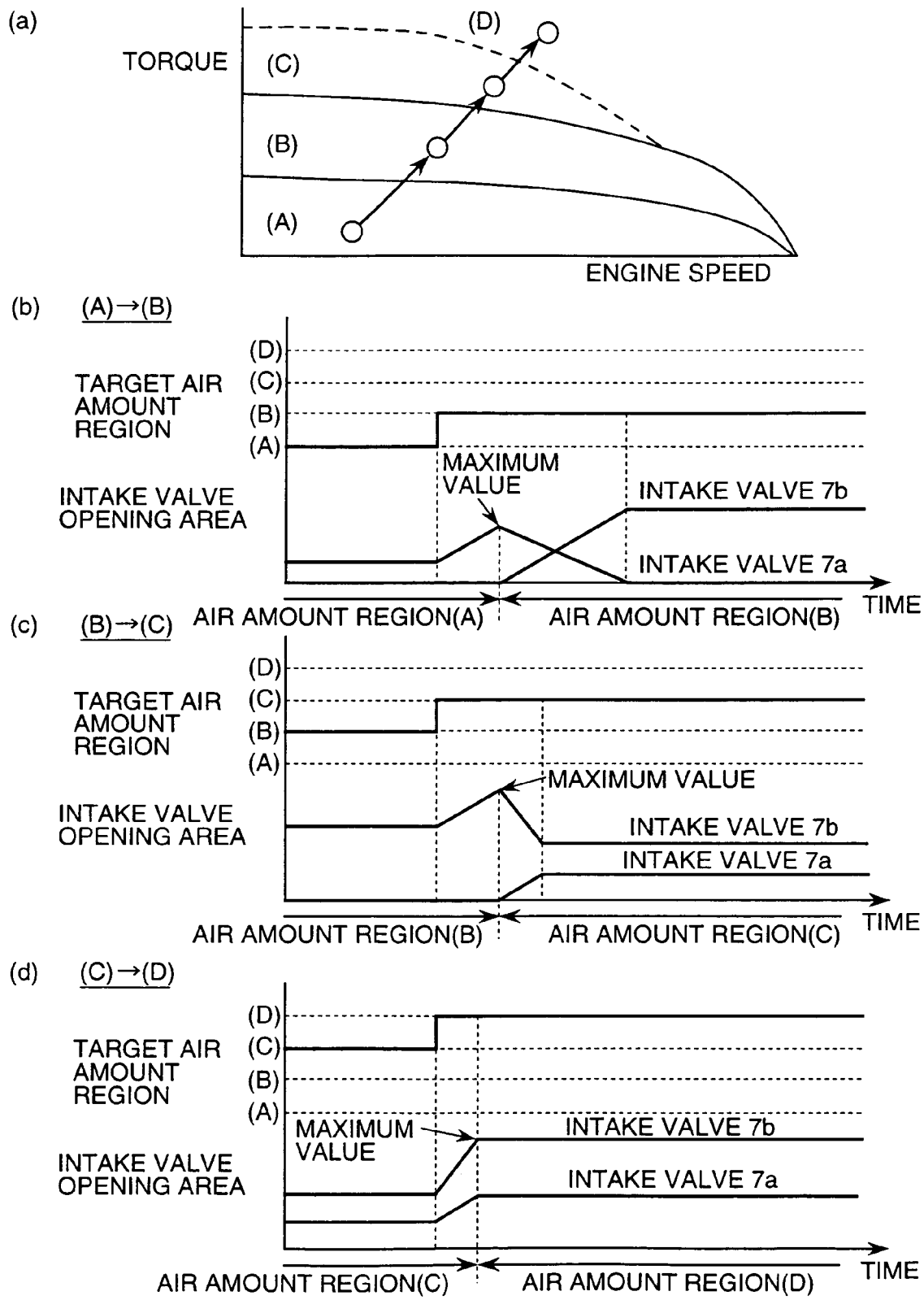
FIG. 5 is a view showing a method of controlling the intake valve operation during transition in the first embodiment of the present invention.

Next, the control during transition in this embodiment is explained by using FIG. 5. Various changes in the engine speed and the torque are occurred by control unit 13 according to the driver's intention as shown in FIG. 5(a).

First of all, the opening space is increased by increasing the lift amount and the open valve period of intake valve 7a as shown in FIG. 5(b) when the target air amount changes from region (A) to region (B) in FIG. 5(a). When the lift amount and the open valve period of intake valve 7 reaches the structural maximum value and the air amount reaches the maximum air amount obtained when only intake valve 7a is operated, the lift amount and the open valve period of intake valve 7a is decreased during transitional period. In synchronization with the operation, the lift amount and the open valve period of intake valve 7b is increased and the opening space is increased. The target value of the opening space of intake valve 7b is decided depending on the target air amount decided based on the driver's intention. The opening space of intake valve 7a is finally adjusted to zero.

The reason why such control is carried out is as follows. It is assumed that the control is done to increase the opening space of intake valve 7b with the opening space of intake valve 7a maintained in the maximum value. When the target air amount is slightly more than the maximum air amount obtained when only intake valve 7a is operated, it become necessary to increase the lift amount and the open valve period of intake valve 7b minutely and increase the opening space. As a result, the variation of the intake airflow is occurred due to the variation of the lift amount and the open valve period of intake valve 7b.

Then, the opening space of intake valve 7b is increased to secure the air amount by decreasing the opening space of intake valve 7a in this embodiment. Because increasing the lift amount and the open valve period of intake valve 7b by this control becomes possible, the variation of the intake airflow due to the variation of the lift amount and the open valve period of intake valve 7b can be decreased.

The variation of the intake airflow due to the variation of the lift amount and the open valve period of intake valve 7a can be completely excluded by finally adjusting the opening space of intake valve 7a to 0. It is possible not to adjust the opening space of intake valve 7a to 0. In that case, the desired values of the opening spaces of intake valve 7a and intake valve 7b are decided depending on the target air amount decided based on the driver's intention.

Moreover, during transition which shifts from the low air amount region to the medium air amount region, the magnitude of the decrease of the air amount which passes through intake valve 7a which operates in the low air amount region can be changed according to the operating state before the transition changes and the operating state after the transition based on the driver's intention.

First of all, the opening space is increased by increasing the lift amount and the open valve period of intake valve 7b as shown in FIG. 5(c) when the target air amount changes from region (B) to (C) in FIG. 5(a). When the lift amount and the open valve period of intake valve 7b reaches the structural maximum value and the air amount reaches the maximum air amount obtained when only intake valve 7b is operated, the lift amount and the open valve period of intake valve 7b is decreased during transition. The opening space is increased by increasing the lift amount and the open valve period of intake valve 7a in synchronization with this. The target values of the opening spaces of intake valve 7a and intake valve 7b are decided depending on the target air amount decided based on the driver's intention.

The reason to do this control is as follows. It is assumed that the control is done to increase the opening space of intake valve 7a with the opening space of intake valve 7b maintained in the maximum value. When the target air amount is slightly more than the air amount obtained when only intake valve 7b is operated, the variation of the intake airflow is occurred by the variation of the lift amount and the open valve period of intake valve 7a because the opening space is increased by minutely increasing the lift amount and the open valve period of intake valve 7a.

Then, the opening space of intake valve 7a is increased to secure the air amount by decreasing the opening space of intake valve 7b in this embodiment. Because increasing the lift amount and the open valve period of intake valve 7a by this control becomes possible, the variation of the intake airflow due to the variation of the lift amount and the open valve period of intake valve 7a can be decreased. As a result, the decrease in the control accuracy of the air fuel ratio of the mixture, which originates in the variation of the intake airflow is canceled, and the performance of an engine is improved.

The opening space is increased by increasing the lift amounts and the open valve periods of intake valve 7a and intake valve 7b as shown in FIG. 5(d) when the target air amount changes from region (C) to (D) in FIG. 5(a). Because the lift amounts and the open valve periods of intake valve 7a and intake valve 7b can be maintained a large value enough during transition from region (C) to (D), there is no need to control the intake valve like the transition of region (A) to (B) or region (B) to (C). The target values of the opening spaces of intake valve 7a and intake valve 7b are decided depending on the target air amount decided based on the driver's intention.

Oppositely, when the target air amount shifts from the high air amount region to the low air amount region, the intake airflow with intake valve 7b which operates in the medium and the high air amount regions is decreased and the intake airflow with intake valve 7a which operates in the low air amount region is increased during transition.

Figure 6:
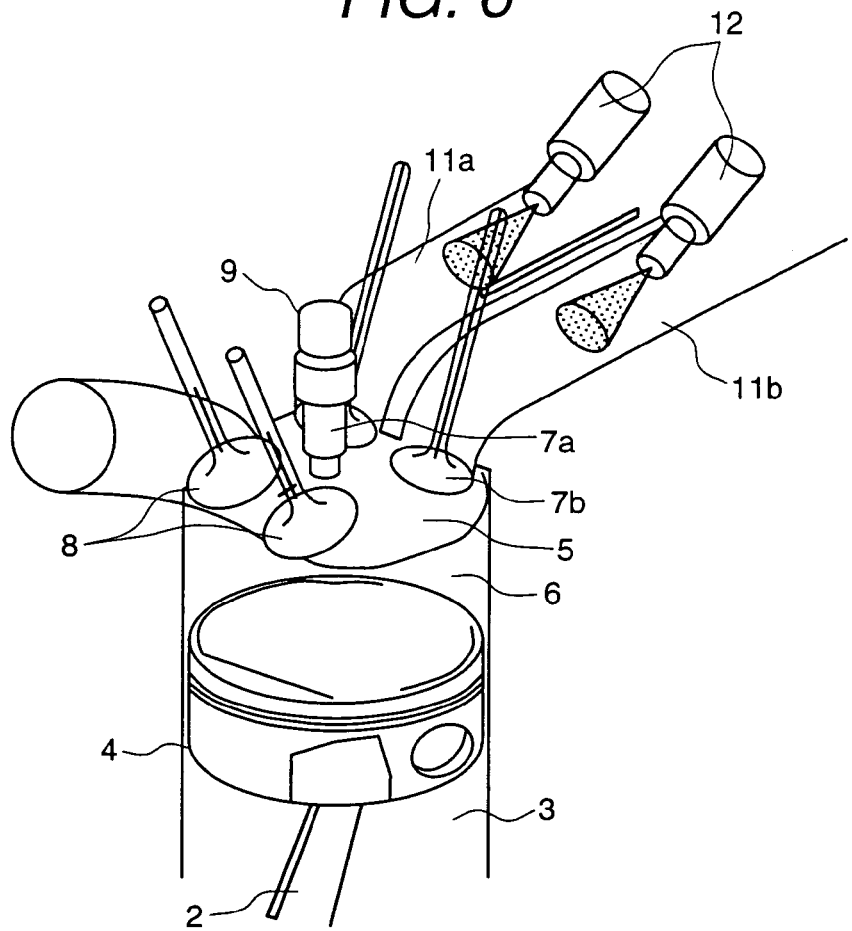
FIG. 6 is a view showing the arrangement of the fuel injection valve of the variable valve type internal combustion engine according to the first and the second embodiments of the present invention.

Because the air amount which passes through a plurality of intake valves 7a and 7b provided in one cylinder is different according to the operation region of the engine in this embodiment, it is necessary to jet the fuel amount suitable to the air amount passing through each intake valve every operation mode of the intake valve shown in this embodiment. It is desirable to provide fuel injection valve 12 individually in a plurality of intake ports 11a and 11b provided in one cylinder as shown in FIG. 6.

(Embodiment 2)

Figure 7:
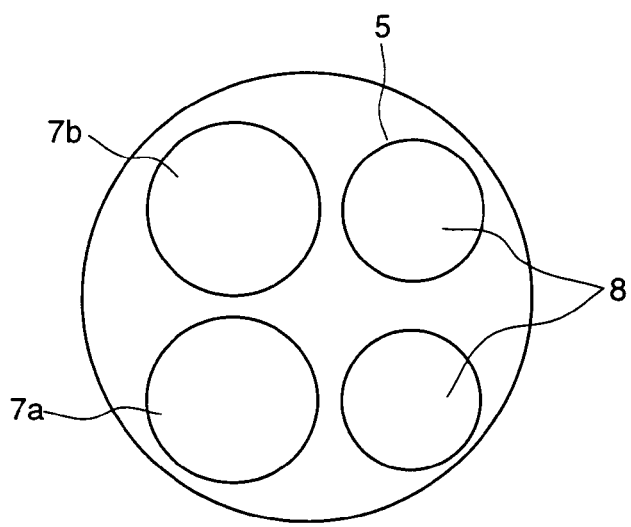
FIG. 7 is a view showing the configuration of the intake valve seat diameter in the second embodiment of the present invention.

Next, embodiment 2 of a variable valve type internal combustion engine according to the present invention is explained. Whole configuration of the variable valve type internal combustion engine in this embodiment is equal to one shown in FIG. 1. In this embodiment, the diameters of valve seats of intake valves 7c and 7d provided in one cylinder are equal to each other. FIG. 7 shows the configuration of cylinder head 5 seen from the side of piston 4.

In this embodiment, intake valve 7c used in the low air amount region and intake valve 7d used in the high air amount region are provided. The operation mode of each of Intake valves 7c and 7d provided in one cylinder is changed according to the operation region of the engine. Also in this embodiment, the operation mode of the intake valve means the combination of the lift amount, the open valve period and the phase.

Concretely, air amount is controlled by making intake valve 7d zero-lift, and controlling the lift amount, the open valve period and the phase of intake valve 7 in low air amount region (A) as shown in FIG. 8(b). In high air amount regions (C) and (D) as shown in FIGS. 8(c) and 8(d), the intake airflow is controlled by controlling the lift amounts, the open valve periods and the phases of both intake valves 7 and 7d. Now, FIG. 8(a) shows an example of the distribution from the low air amount (A), the middle air amount (C) and the high air amount region (D) decided by the torque and the engine speed.

In region (C) of the high air amount region where air amount is comparatively small, the intake airflow is reduced by reducing the lift amount and the open valve period of intake valve 7c and changing the phase, and by increasing the lift amount and the open valve period of intake valve 7d and changing the phase, the difference between the demand air amount and the air amount which passes through intake valve 7 is supplied to combustion chamber 6 through intake valve 7d.

The air amount in this embodiment means the air amount inhaled in one cycle. Three intake valves may be used in similar ways though two intake valves are used in the embodiment shown in FIG. 7. When three intake valves is used, the intake valve used in the low air amount region is set as intake valve 7c, and other two intake valves are set as intake valve 7d.

Because the air amount is controlled only with intake valve 7c in the low air amount region (A), it is necessary to increase the lift amount and the open valve period to secure the opening space which suits the demand intake airflow compared with the case that the air amount is controlled by similarly controlling each of plural intake valves provided in one cylinder. As a result, the variation of the intake airflow due to the variation of the lift amount and the open valve period of intake valve in the low air amount region can be decreased as shown in FIG. 4. As a result, the decrease in the control accuracy of the air fuel ratio of the mixture which originates in the variation of the intake airflow is canceled, and the performance of an engine is improved.

In low air amount region (A) where the intake airflow is controlled only with intake valve 7c, the air amount is decided depending on the air amount when intake valve 7c is made the full lift in each engine speed. It is possible to give the negative pressure in the intake pipe by shutting the throttle provided in the upstream of the intake valve and increase the lift amount and the open valve period of intake valve 7c in low air amount region (A). The reason for this is that the air amount must be secured by increasing the opening space of intake valve 7a because the air amount filled in the intake pipe may decrease.

Both intake valve 7c and intake valve 7d are operated to secure the intake airflow in the high air amount region. When the lift amount and the open valve period of intake valve 7d is increased from zero-lift while maintaining the lift amount and the open valve period of intake valve 7c in the maximum value in region (C) where the air amount is comparatively small in the high air amount region, the variation of the air amount is occurred by the variation of the lift amount and the open valve period of intake valve 7d.

Then, the lift amount and the open valve period of intake valve 7c when the lift amount and the open valve period in which the variation of the air amount which passes through intake valve 7d falls within the allowable range are given are predetermined. The difference between the demand air amount and the air amount which passes through intake valve 7c can be given by controlling the lift amount, the open valve period and the phase of intake valve 7d by giving intake valve 7c the lift amount and the open valve period predetermined in region (C) where air amount is comparatively small in the high air amount region.

Next, the control during transition in this embodiment is explained by using FIG. 9. Various changes in the engine speed and the torque are occurred by control unit 13 according to the driver's intention as shown in FIG. 9(a).

First of all, the opening space is increased by increasing the lift amount and the open valve period of intake valve 7c as shown in FIG. 9(b) when the target air amount changes from region (A) to region (C) in FIG. 9(a). When the lift amount and the open valve period of intake valve 7c reaches the structural maximum value and the air amount reaches the maximum air amount obtained when only intake valve 7c is operated, the lift amount and the open valve period of intake valve 7c is decreased during transitional period. In synchronization with the operation, the lift amount and the open valve period of intake valve 7d is increased and the opening space is increased. The target value of the opening space of intake valves 7 and 7d is decided depending on the target air amount decided based on the driver's intention.

The reason why such control is carried out is as follows. It is assumed that the control is done to increase the opening space of intake valve 7d with the opening space of intake valve 7c maintained in the maximum value. When the target air amount is slightly more than the maximum air amount obtained when only intake valve 7c is operated, it become necessary to increase the lift amount and the open valve period of intake valve 7d minutely and increase the opening space. As a result, the variation of the intake airflow is occurred due to the variation of the lift amount and the open valve period of intake valve 7d.

Then, the opening space of intake valve 7d is increased to secure the air amount by decreasing the opening space of intake valve 7c in this embodiment. Because increasing the lift amount and the open valve period of intake valve 7d by this control becomes possible, the variation of the intake airflow due to the variation of the lift amount and the open valve period of intake valve 7d can be decreased. As a result, the decrease in the control accuracy of the air fuel ratio of the mixture which originates in the variation of the intake airflow is canceled, and the performance of an engine is improved.

Moreover, during transition which shifts from the low air amount region to the high air amount region, the magnitude of the decrease of the air amount which passes through intake valve 7c which operates in the low air amount region can be changed according to the operating state before the transition changes and the operating state after the transition based on the driver's intention.

The opening space is increased by increasing the lift amounts and the open valve periods of intake valve 7c and intake valve 7d as shown in FIG. 9(c) when the target air amount changes from region (C) to (D) in FIG. 9(a). Because the lift amounts and the open valve periods of intake valve 7c and intake valve 7d can be maintained a large value enough during transition from region (C) to (D), there is no need to control the intake valve like the transition of region (A) to (C). The target values of the opening spaces of intake valve 7c and intake valve 7d are decided depending on the target air amount decided based on the driver's intention.

Oppositely, when the target air amount shifts from the high air amount region to the low air amount region, the intake airflow with intake valve 7d which operates in the medium and the high air amount regions is decreased and the intake airflow with intake valve 7c which operates in the low air amount region is increased during transition.

Because the air amount which passes through plural intake valves 7c and 7d provided in one cylinder is different according to the operation region of the engine in this embodiment, it is necessary to jet the fuel amount suitable to the air amount passing through each intake valve every operation mode of the intake valves 7c and 7d shown in this embodiment. It is desirable to provide fuel injection valve 12 individually in plural intake ports provided in one cylinder as shown in FIG. 6.

According to the variable valve type internal combustion engine and the control method variable valve type internal combustion engine of the present invention as understood from the above-mentioned explanation, the variation of the intake airflow due to the variation of the lift amount and the open valve period of the intake valves can be decreased by individually changing the operation modes of a plurality of intake valves provided in one cylinder according to the operation region of the engine. The decrease in the control accuracy of the air fuel ratio of the mixture which originates in the variation of the intake airflow is canceled, and the performance of an engine can be improved.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A variable valve type internal combustion engine in which the intake airflow is controlled with a plurality of intake valves, comprising a plurality of intake ports provided in each cylinder, an intake valve which individually opens and shuts each intake port, a variable valve gear which continuously and changeably sets at least one of the lift amount and the open valve period of each intake valve, and a control means in which at least one of the lift amount and the open valve period of plural intake valves can be set independently for each intake valve, and the operation modes of said plural intake valves in one cylinder can be set respectively and independently according to the operating states of the internal combustion engine, wherein said control means stops at least one of said plural intake valves provided in one cylinder in a low air amount region and operates at least one other of said plural intake valves in the low air amount region, and at least two of the plural intake valves are operated in medium and high air amount regions.

2. A variable valve type internal combustion engine according to claim 1, wherein the diameters of at least two of the intake valves provided in one cylinder are different from each other.

3. A variable valve type internal combustion engine according to claim 2, wherein said control means stops the intake valve with a large diameter among said plural intake valves provided in one cylinder in the low air amount region.

4. A variable valve type internal combustion engine according to claim 3, wherein said control means operates all of said plural intake valves provided in one cylinder in the medium and high air amount region.

5. A variable valve type internal combustion engine according to claim 4, wherein said control means decreases the intake airflow with the intake valve which operates in the low air amount region, and increases the intake airflow with the intake valve which operates in the medium and high air amount region during transition which shifts from the low air amount region to the high air amount region.

6. A variable valve type internal combustion engine according to claim 5, wherein during transition which shifts from the low air amount region to the medium and the high air amount region, said control means changes the magnitude of the decrease of the air amount which passes through the intake valve which operates in the low air amount region according to the operating state before the transition and the operating state after the transition based on the driver's intention.

7. A variable valve type internal combustion engine according to claim 5, wherein according to the operating state before the transition and the operating state after the transition based on the driver's intention, the air amount which passes through the intake valve which operates in the low load operation region is decreased compared with the air amount before the transition, and the increase in the air amount which passes through the intake valve which operates in the high load operation region compared with the air amount before the transition is prohibited.

8. A variable valve type internal combustion engine according to claim 4, wherein said control means decreases the intake airflow with the intake valve which operates in the medium and the high air amount regions, and increases the intake airflow with the intake valve which operates in the low air amount region during transition which shifts from the high air amount region to the low air amount region.

9. A variable valve type internal combustion engine according to claim 3, wherein said control means operates the intake valve with a large diameter among said plural intake valves provided in one cylinder, and stops the intake valve with a small diameter in the medium air amount region, and operates all of said plural intake valves provided in one cylinder in the high air amount region.

10. A variable valve type internal combustion engine according to claim 3, wherein when the operation valve is switched from the intake valve which operates in the low air amount region to the intake valve which operates in the high air amount region, the minimum intake airflow of the intake valve which operates in the high air amount region is more than the maximum intake airflow of the intake valve which operates in the low air amount region.

11. A variable valve type internal combustion engine according to claim 1, further comprising a means which generates a negative pressure upstream of the intake valve in the low air amount region, wherein the control of the intake airflow in the low air amount region is performed by using one intake valve among said plural intake valves provided in one cylinder.

12. A variable valve type internal combustion engine according to claim 1, wherein a fuel injection valve is provided individually in each of said plural intake ports provided in one cylinder.

13. A variable valve type internal combustion engine according to claim 12, wherein a fuel injection amount to each of the plural intake port is decided depending on the air amount which passes through each of the intake valves provided in one cylinder.

14. A method of controlling a variable valve type internal combustion engine in which the intake airflow is controlled with a plurality of intake valves, comprising a plurality of intake ports provided in each cylinder, an intake valve which individually opens and shuts each intake port, and a variable valve gear which continuously and changeably sets at least one of the lift amount and the open valve period of each of the intake valves, wherein at least one of said plural intake valves provided in one cylinder is stopped in a low air amount region and at least one of said plural intake valves is operated in the low air amount region, and at least two of the plural intake valves are operated in medium and high air amount regions.

15. A variable valve type internal combustion engine in which the intake airflow is controlled with a plurality of intake valves, comprising a plurality of intake ports provided in each cylinder, an intake valve which individually opens and shuts each intake port, and a variable valve gear which continuously and changeably sets at least one of the lift amount and the open valve period of each intake valve, further comprising a controller in which at least one of the lift amount and the open valve period of plural intake valves can be set independently for each intake valve, and the operation modes of said plural intake valves in one cylinder can be set respectively and independently according to the operating states of the internal combustion engine, further comprising a negative pressure generator which generates a negative pressure upstream of the intake valve in the low air amount region, wherein the control of the intake airflow in the low air amount region is performed by using one intake valve among said plural intake valves provided in one cylinder.

16. A variable valve type internal combustion engine according to claim 15, wherein the negative pressure generator is a throttle valve upstream of the intake valve.

* * * * *